United States Patent

Winston

Patent Number: 5,610,768
Date of Patent: Mar. 11, 1997

[54] NONIMAGING RADIANT ENERGY DEVICE

[75] Inventor: Roland Winston, Chicago, Ill.

[73] Assignees: The Argonne National Laboratory; The University of Chicago Development Corporation, both of Chicago, Ill.

[21] Appl. No.: 471,730

[22] Filed: Jun. 6, 1995

Related U.S. Application Data

[62] Division of Ser. No. 115,220, Sep. 19, 1993, Pat. No. 5,557,478, which is a division of Ser. No. 348,056, May 19, 1989, Pat. No. 5,243,459.

[51] Int. Cl.$^6$ ............ G02B 17/00; G02B 21/00
[52] U.S. Cl. ............ 359/727; 359/362; 359/364
[58] Field of Search ............ 359/709–711, 727, 359/852–869, 362–366, 846–851; 126/438–441, 657, 683, 695; 136/206, 246; 385/50, 146

[56] References Cited

U.S. PATENT DOCUMENTS

| | | | |
|---|---|---|---|
| 3,390,262 | 6/1968 | Elmer | 240/41.37 |
| 3,805,052 | 4/1974 | Rambauske | 240/41.35 C |
| 3,899,672 | 8/1975 | Levi-Setti | 359/869 |
| 3,923,381 | 12/1975 | Winston | 359/852 |
| 3,957,031 | 5/1976 | Winston | 126/699 |
| 4,002,499 | 1/1977 | Winston | 136/206 |
| 4,003,638 | 1/1977 | Winston | 359/852 |
| 4,045,246 | 8/1977 | Mlavsky et al. | 136/246 |

(List continued on next page.)

FOREIGN PATENT DOCUMENTS 2709284  9/1977  Germany.

OTHER PUBLICATIONS

J. O'Gallagher and R. Winston, "Test of A 'Trumpet' Secondary Concentrator With a Paraboloidal Dish Primary," *Solar Energy*, vol. 36, No. 1, pp. 47–44 (1986).

J. O'Gallagher, R. Winston, and W. T. Welford, "Axially Symmetric Nonimaging Flux Concentrators With the Maximum Theoretical Concentration Ratio," *Journal of the Optical Society of America A*, vol. 4, pp. 66–68 (Jan. 1987).

X. Ning, R. Winston, and J. O'Gallagher, "Dielectric Totally Internally Reflecting Concentrators," *Applied Optics*, vol. 26, No. 2, pp. 300–305 (Jan. 1987).

(List continued on next page.)

*Primary Examiner*—Thong Nguyen
*Attorney, Agent, or Firm*—Marshall, O'Toole, Gerstein, Murray & Borun

[57] ABSTRACT

A nonimaging radiant energy device may include a hyperbolically shaped reflective element with a radiant energy inlet and a radiant energy outlet. A convex lens is provided at the radiant energy inlet and a concave lens is provided at the radiant energy outlet. Due to the provision of the lenses and the shape of the walls of the reflective element, the radiant energy incident at the radiant energy inlet within a predetermined angle of acceptance is emitted from the radiant energy outlet exclusively within an acute exit angle. In another embodiment, the radiant energy device may include two interconnected hyperbolically shaped reflective elements with a respective convex lens being provided at each aperture of the device.

5 Claims, 4 Drawing Sheets

U.S. PATENT DOCUMENTS

| | | | |
|---|---|---|---|
| 4,114,592 | 9/1978 | Winston | 126/683 |
| 4,129,115 | 12/1978 | Wyatt | 126/690 |
| 4,130,107 | 12/1978 | Rabl et al. | 126/684 |
| 4,139,286 | 2/1979 | Hein et al. | 126/573 |
| 4,225,782 | 9/1980 | Kuppenheimer, Jr. et al. | 359/869 |
| 4,230,095 | 10/1980 | Winston | 126/657 |
| 4,237,332 | 12/1980 | Winston | 136/259 |
| 4,240,692 | 12/1980 | Winston | 385/146 |
| 4,359,265 | 11/1982 | Winston | 359/852 |
| 4,367,519 | 1/1983 | Houghton et al. | 362/268 |
| 4,387,961 | 6/1983 | Winston | 359/867 |
| 4,419,984 | 12/1983 | McIntire | 126/657 |
| 4,441,783 | 4/1984 | Houghton et al. | 385/146 |
| 4,483,007 | 11/1984 | Winston | 372/72 |
| 4,655,555 | 4/1987 | Machler et al. | 359/365 |
| 4,898,450 | 2/1990 | Jannson et al. | 385/50 |
| 4,912,614 | 3/1990 | Goldenberg | 359/867 |
| 4,922,107 | 5/1990 | Rabl et al. | 359/869 |
| 5,005,958 | 4/1991 | Winston et al. | 359/727 |
| 5,243,459 | 9/1993 | Winston et al. | 359/362 |

OTHER PUBLICATIONS

R. Winston and W. T. Welford, "Design of Nonimaging Concentrators as Second Stages in Tandem With Image-Forming First-Stage Concentrators," *Applied Optics*, vol. 19, No. 3, pp. 347–351 (Feb. 1980).

X. Ning, J. O'Gallagher, and R. Winston, "Optics of Two-Stage Photovoltaic Concentrators With Dielectric Second Stages," *Applied Optics*, vol. 26, No. 7, pp. 1207–1212 (Apr. 1987).

R. Winston, X. Ning, J. O'Gallagher, and W. T. Welford, "New Directions in Nonimaging Optics," Proceedings of the Fifth Symposium on Energy Eng. Sciences, pp. 198–205 (Jun. 17, 1987).

R. Winston, "Nonimaging Optics for Illumination," SPIE, vol. 692, Materials and Optics for Solar Energy Conversion and Advanced Lighting Technology, pp. 224–226 (1986).

R. Winston, "Light Collection Within the Framework of Geometrical Optics," *Journal of the Optical Society of America*, vol. 60, No. 2, pp. 245–247 (Feb. 1970).

R. Winston and W. T. Welford, "Geometrical Vector Flux and Some New Nonimaging Concentrators," *J. Opt. Soc. Am.*, vol. 69, No. 4, pp. 532–535 (4/7).

R. Winston and W. T. Welford, "Ideal Flux Concentrtors as Shapes that do not Disturb the Geometrical Vector Flux Field: A New Derivation of the Compound Parabolic Concentrator," *J. Opt. Soc. Am.*, vol. 69, No. 4, pp. 536–539 (Apr. 1979).

R. Winston and J. O'Gallagher, "Investigations in Non-imaging Optics: Detection of Faint Sources," Proceedings of the Sec. Symposium on Energy Eng. Sciences, pp. 110–115 (Apr. 10–11, 1984).

"The Optics of Nonimaging Concentrators–Light and Solar Energy", by W. T. Welford and R. Winston, Academic Press 1978.

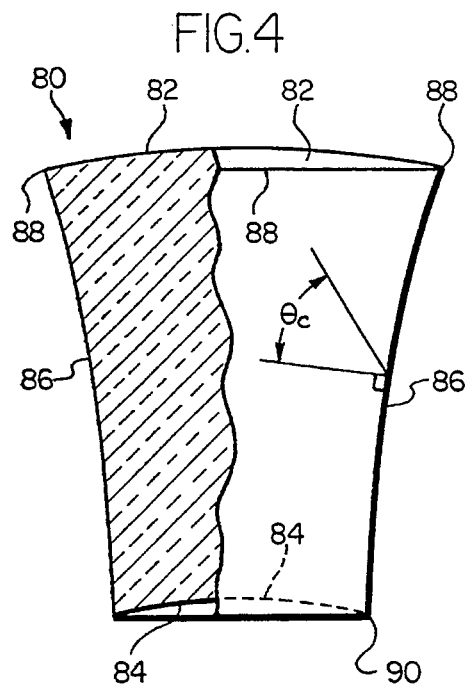
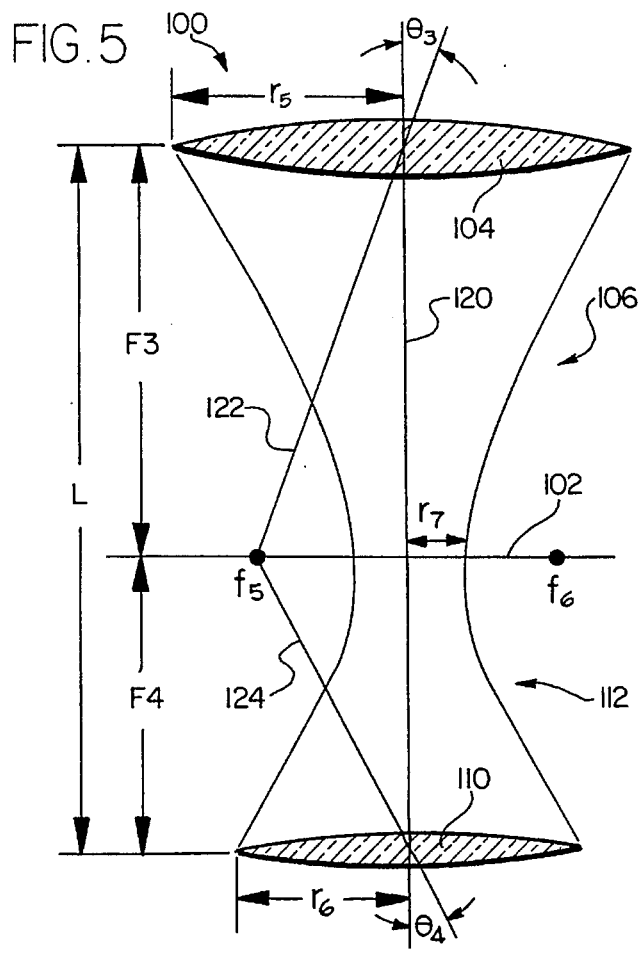
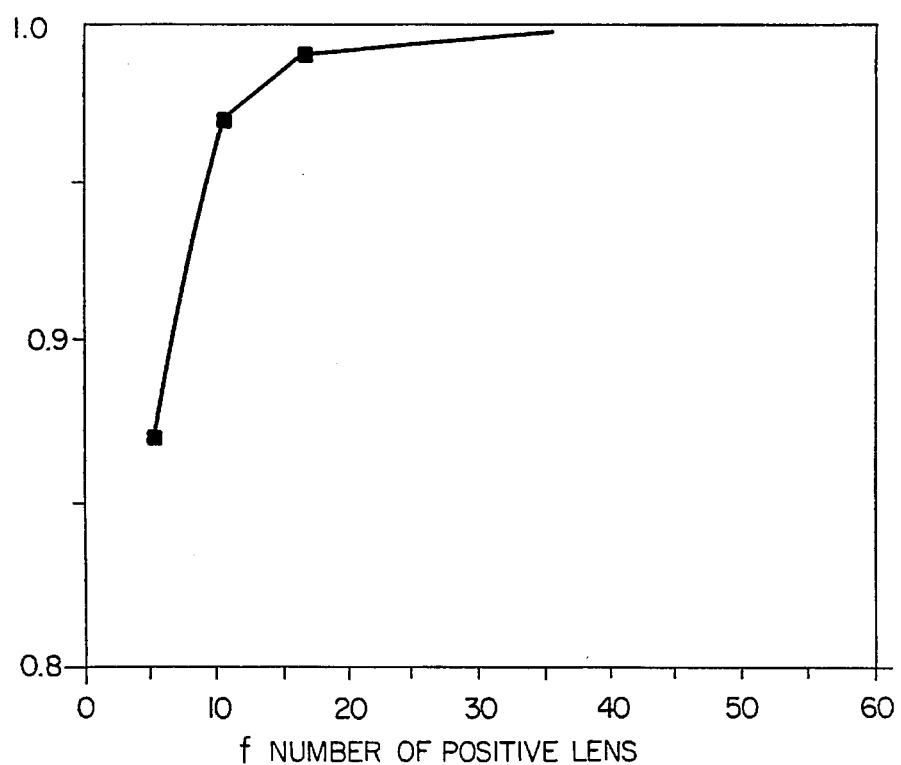

NONIMAGING RADIANT ENERGY DEVICE

This application is a divisional application of U.S. Ser. No. 08/115,220, filed Sep. 1, 1993, now U.S. Pat. No. 5,557,478, which is a divisional application of U.S. Ser. No. 07/348,056 filed May 5, 1989, now U.S. Pat. No. 5,243,459.

The present invention was made pursuant to a funding agreement with the U.S. Department of Energy.

BACKGROUND OF THE INVENTION

The present invention relates generally to nonimaging optics and more particularly to radiant energy devices used in nonimaging optics.

Nonimaging optics deals with the radiation, concentration, and/or transformation of radiant energy such as light where it is unimportant that an image be produced. In imaging systems, such as telescope systems and camera systems for example, the production of an image is of primary concern. In nonimaging optics, the goal is the transfer, radiation, or concentration of radiant energy such as light with maximum efficiency without regard to the formation of an image. In most if not all nonimaging systems, visually coherent images are not formed. Examples of applications for nonimaging optics include fiber optics, illumination and optical detection, where a primary concern is the efficient transfer of light energy.

Numerous practical situations exist in applied optics wherein it is desirable to perform radiant energy transformations relating to the angular divergence and cross-sectional area of radiant energy emissions such as light beams. Optical power launching and fiber-fiber coupling in optical fiber systems, for example, routinely require such angular transformations of light energy. Similarly, the transformation of a radiative light source into a directional beam of specified spatial intensity and angular divergence is required in many illumination applications.

Of interest to the background of the present invention are nonimaging radiant energy transformation devices such as are illustrated in U.S. Pat. Nos. 4,114,592 and 4,240,692. These devices possess light transmission properties which are superior to imaging devices in terms of efficiency of energy transmission, but they are nonetheless subject to skew ray energy losses. Nonimaging radiant energy devices based on radiant energy flow lines are disclosed in U.S. Pat. No. 4,237,332. Combinations of such radiant energy devices, in the form of hyperbolically shaped reflectors, with a lens have been proposed as ideal transformers of input energy of any given angle θ to an angle of 90 degrees. See, Winston, et al., "Investigations in Non-Imaging Optics: Detection of Faint Sources," *Proceedings of the Second Symposium on Energy Engineering Sciences*, pp. 110–115 (Apr. 10–11, 1984) and O'Gallagher, et al., "Axially Symmetric Nonimaging Flux Concentrators With the Maximum Theoretical Concentration Ratio," *Journal of the Optical Society of America A*, Vol. 4, pp. 66–68 (1987).

Despite the above-noted and other developments in the art, there continues to exist a need for energy transducers of novel design which respond to the requirement for highly efficient transformation of, e.g., a light beam of a first acute angular divergence, $\theta_1$, to a second acute angular divergence, $\theta_2$, as well as other nonimaging radiant energy devices having desirable characteristics.

SUMMARY OF THE INVENTION

In one aspect, the present invention provides improved radiant energy transfer devices which are capable of transforming radiant energy beams of input angular divergence $\theta_1$ to any selected output angular divergence $\theta_2$ less than 90 degrees and are thus suited for use, for example, as couplers in fiber optic, illumination, and optical detection systems.

In this aspect, the invention is directed to a radiant energy transformer having a reflective wall with a radiant energy inlet and a radiant energy outlet. The reflective wall is used in conjunction with a pair of lenses, one of the lenses being provided at the radiant energy inlet and the other being provided at the radiant energy outlet. The focal lengths of the lenses are specially chosen such that, when the lenses are operatively coupled to the reflective wall, they share a common focal plane; that is, the difference between the respective focal lengths of the two lenses is substantially equal to the distance between the two lenses. The shape of the reflective wall is such that the radiant energy that impinges on the lens at the radiant energy inlet within a first acute angle is reflected by the wall to the second lens at the radiant energy outlet so that it emerges from the radiant energy outlet exclusively within a second acute angle, the second acute angle being different from the first acute angle.

In another aspect, the invention is directed to a radiant energy transformer having a reflective wall which first narrows from a radiant energy inlet to an intermediate portion, then increases in diameter from the intermediate portion to a radiant energy outlet. One lens is provided at the radiant energy inlet and another lens is provided at the outlet. The shape of the reflective wall is such that the radiant energy impinging upon the lens at the energy inlet within an acute angle is reflected by the wall so that it emerges from the second lens exclusively within a second acute angle.

A transformer in accordance with the invention may have reflective walls that are mirrored surfaces, the interior of the reflective walls being substantially hollow, or alternatively, the reflective walls may be the surfaces of a solid dielectric body, with the lenses comprising opposed, curved surfaces of the dielectric body.

In another feature, the invention comprises a first optical element of a solid dielectric material optically coupled to a second optical element. The second optical element has a reflective surface with a shape substantially corresponding to a radiant energy flow line through the solid dielectric material. This feature of the invention takes advantage of a novel concept referred to below as the "effective optical distance" within a nonimaging, radiant energy device. It has been discovered that this new concept of effective optical distance can be used to determine radiant energy flow lines through dielectric elements in nonimaging systems. Previously, the determination of radiant energy flow lines was limited to nonimaging systems in which the optical paths passed only through air.

Other aspects, features and advantages of the present invention will be apparent in view of the following detailed description of several preferred embodiments of the invention, which is made in connection with the drawings, a brief description of which is provided below.

BRIEF DESCRIPTION OF THE DRAWINGS

FIG. 3 is a computer simulation of the throughput of an optical fiber coupler according to the invention versus the f/stop of the convex lens;

FIG. 4 illustrates a second embodiment of a radiant energy transformer in accordance with the invention;

FIG. 5 illustrates a third embodiment of a radiant energy transformer in accordance with the invention;

DETAILED DESCRIPTION OF SEVERAL PREFERRED EMBODIMENTS

Figure 1:
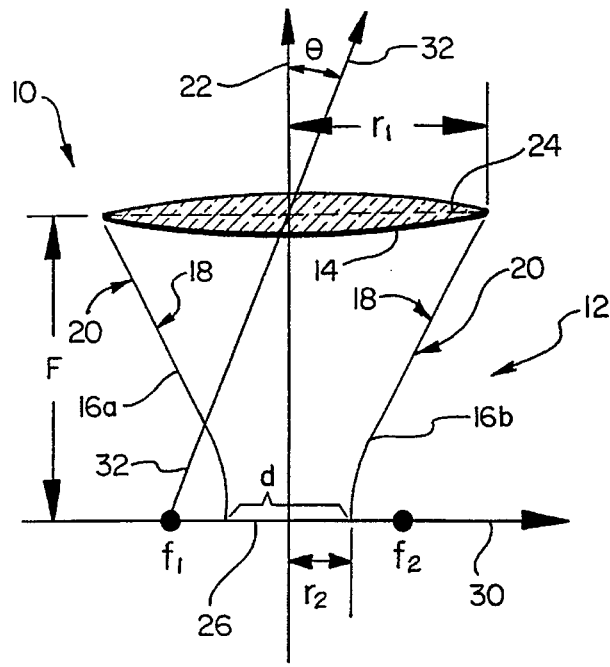
FIG. 1 illustrates a radiant energy concentrator for $\theta_1$ to 90° radiant energy transformation.

Now referring to FIG. 1, a radiant energy concentrator 10 is shown in cross-section. The concentrator 10 comprises a reflective optical element 12 and a converging lens 14. The reflective element 12 is hyperbolically shaped, as indicated by a pair of hyperbolic lines 16a, 16b. The reflective element 12 causes radiant energy rays impinging on the interior surface 18 of element 12 to be reflected. The reflective capability of the element 12 may result from a reflective coating on the interior surface 18 or the exterior surface 20 of the element 12, like a mirror, for example, or the element 12 may comprise a highly polished metal such as chrome.

The element 12 has a first circular aperture at its top portion, indicated by dotted line 24, which acts as a radiant energy inlet. The first circular aperture, and thus the radiant energy inlet, have a radius equal to $r_1$, which is the horizontal distance from a vertical central axis 22 through the element 12. The element 12 has a second circular aperture at its bottom portion, indicated by line 26, which acts as a radiant energy outlet. The radius of the second circular aperture, and thus of the radiant energy outlet, is $r_2$.

The converging lens 14 is provided at the radiant energy inlet of the element 12. The focal length of the lens 14 is chosen so that it equals the height of the element 12, which height is shown to be F in FIG. 1.

As indicated above, the element 12 is hyperbolically shaped, as indicated by the curves 16a, 16b. Specifically, the curves 16a and 16b are hyperbolic with respect to a pair of foci $f_1$ and $f_2$ on a horizontal axis 30, the foci $f_1$, $f_2$ being coplanar with the radiant energy outlet of the element 12. In accordance with the definition of a hyperbola, each point of the curve 16a lies a constant distance d closer to $f_1$ than $f_2$, and each point on the curve 16b lies the same distance d closer to $f_2$ than $f_1$. Since the lower circular aperture of the element 12 is coplanar with the foci $f_1$, $f_2$, the distance d is equal to the diameter of the lower aperture. The element 12 may be rotationally symmetric about the central axis 22, in which case rotation of either curve 16a or 16b will define the shape of the reflective element 12.

The hyperbolic shape of the reflective element 12, in combination with the lens 14, performs a particular function associated with the passage of radiant energy through the concentrator 10. In particular, it causes the radiant energy which is incident at the radiant energy inlet within a predetermined acute angle to be transmitted to the radiant energy outlet of the device, either directly or by one or more reflections from its internal surface 18. Radiant energy reaching the outlet 26 is emitted from the concentrator 10 in all directions, ranging from a direction perpendicular to the plane of the radiant energy outlet 26 to a direction parallel to the plane of the outlet 26.

In general, the angle of acceptance of a device such as the concentrator 10 is defined as the angle within which a ray of radiant energy must enter the radiant energy inlet 24 to be guaranteed to pass from the radiant energy inlet 24 to the radiant energy outlet 26, either straight through the concentrator 10 without reflection by the reflective element 12 or by one or more reflections from the interior surface 18 of the element 12. The angle of acceptance, which is defined with respect to the vertical central axis 22 of the concentrator 10 or a ray parallel thereto, is shown to be θ in FIG. 1. By definition, radiant energy incident at the radiant energy inlet 24 at angles less than or equal to the angle of acceptance will reach the outlet 26 either directly or by means of reflection, and energy incident at the inlet at angles greater than the angle of acceptance will not reach the outlet 26.

The transmission ratio of an optical device such as the concentrator 10 is defined as the ratio of radiant energy incident at the radiant energy inlet 24 to the radiant energy which passes through the concentrator 10 to be emitted at the output. Thus, the transmission ratio of the concentrator 10 equals substantially one when all radiant energy is incident at the radiant energy inlet 24 within the angle of acceptance, and the transmission ratio is substantially zero when all radiant energy is incident at angles larger than the angle of acceptance.

An optical device which has a transmission ratio that is either substantially zero or one, depending upon the angle of incidence, is considered to be an "ideal" device. Such an ideal device will necessarily have a sharply defined angle of acceptance. Of course, the transmission ratios of many optical devices may vary between zero and one since many devices do not have such sharply defined angles of acceptance.

The manner of construction of the concentrator of FIG. 1 is relatively straightforward. The concentrator 10 is typically made in accordance with three predetermined parameters: 1) the radius of the radiant energy inlet 24; 2) the angle of acceptance θ; and 3) the focal length of the lens 14. Using the method described below, the concentrator 10 can be designed for any numeric combination of the foregoing three parameters. However, while any numeric combination may be used, several practical considerations should be taken into account.

The principal consideration involves choosing the focal length of the lens 14. It is well known that lenses which have relatively short focal lengths for a given lens diameter have more inherent optical aberrations than lenses with relatively large focal lengths. Such aberrations generally result in a "blurring" of the angle of acceptance. As a result of such blurring, instead of having a very sharp dropoff in the transmission ratio upon the incident angle of the radiant energy exceeding the angle of acceptance, the dropoff is more gradual, and may require several degrees of change in the incident angle before the transmission ratio drops to zero. Thus, it is generally desirable to have a relatively long focal length in order to preserve a sharp angle of acceptance.

However, since the focal length of the lens 14 is equal to the height of the reflective element 12 as described above, the use of a lens 14 having a relatively long focal length necessitates the use of a taller element 12. This may be disadvantageous due to increased material requirement or in applications where smaller size is required. Thus, there is a direct tradeoff in performance versus construction of the concentrator 10. In applications having strict performance requirements, a lens 14 having a longer focal length would be needed, thus necessitating a taller concentrator 10.

The angle of acceptance and the size of the radiant energy inlet 24 are typically specified by the particular application in which the concentrator 10 is to be used.

Once the focal length, angle of acceptance, and radiant energy inlet size are chosen, the concentrator 10 may be constructed in accordance with the following steps. First, the radius of the radiant energy outlet 26 is calculated, based upon the selected radius of the radiant energy inlet 24 and the selected angle of acceptance, in accordance with Equation [1] set forth below:

$$r_2 = r_1 * \sin \theta, \quad [1]$$

where $r_2$ is the radius of the radiant energy outlet 26, $r_1$ is the radius of the radiant energy inlet 24, and $\theta$ is the selected angle of acceptance.

Since the focal length of the lens 14, the height of the element 12, and radii of the radiant energy inlet 24 and outlet 26 have already been determined, the only parameter of the concentrator 10 remaining to be determined is the shape, or eccentricity, of the hyperbolic element 12, which is determined by locating two loci and making the walls hyperbolic with respect to the foci.

A first focus is located by finding the point at which a ray passing through the center of the lens 14 at the selected angle with respect to the central axis 22 of the concentrator 10 intersects the plane represented by the radiant energy outlet 26. The ray will pass through one focus with respect to which the hyperbola should be constructed. The other focus is determined simply by placing it at an equal distance on the other side of the central axis 22 of the concentrator 10. Such a ray, indicated by the numeral 32, is shown in FIG. 1. The ray 32 passes through the left focus $f_1$, and the foci $f_1$, $f_2$ are equidistant from the axis 22. The walls are then made hyperbolic with respect to these two foci.

In the actual construction of the device, once one of the hyperbolic curves 16a, 16b is determined, the element 12 can be manufactured in a conventional manner, for example, by a lathe.

The theory of operation of the device 10 of FIG. 1 depends upon the interaction of lens principles and nonimaging optics principles. As is well known and as described in more detail below, radiant energy concentrators having shapes corresponding to radiant energy flow lines, which are hyperbolic in air, effectively transform a virtual source of radiant energy into a smaller real source, thus increasing the concentration efficiency. In FIG. 1, the real source of energy coincides with the radiant energy outlet 26 and the virtual source is larger, its edges being represented by the two foci $f_1$, $f_2$. In a rotationally symmetric embodiment, the virtual source would be a circle. Thus, the reflective element 12 acts to transfer all radiant energy rays that would impinge the virtual source to be reflected to the real source, or to the radiant energy outlet 26.

When the lens 14 is optically coupled to the reflective element 12 at its radiant energy inlet 24, it can be seen that radiant energy rays incident on the lens 14 at angles greater than $\theta$ will not fall within the virtual source represented by $f_1$ and $f_2$, and thus they will not be reflected to the real source, or radiant energy outlet 26. This will be apparent in view of two basic principles of optics. First, rays that pass through the center of a thin lens are substantially undeflected. Second, parallel rays impinging upon a perfect lens converge at a point on the focal plane of the lens.

With these two basic principles in mind, it can be seen that the ray 32 shown in FIG. 1 and all rays impinging on the lens 14 in a parallel direction to ray 32 will focus at the edge $f_1$ of the virtual source, since $f_1$ is on the focal plane of the lens 14 as described above and since the ray 32, being incident at the center of the lens 14, passes through undeflected.

Now, imagine a ray that impinges upon the center of the lens at an angle larger than the angle $\theta$ shown in FIG. 1. Since such a ray will pass through the center of the lens 14 undeflected, it will clearly fall to the left of $f_1$, and thus outside the virtual source. Nor will rays parallel to such a ray fall within the virtual source since they would converge at the same point on the focal plane. Thus, all such rays having incident angles larger than $\theta$ will not fall within the virtual source either. Since these rays do not fall within the virtual source, they will not be reflected to the radiant energy outlet by the reflective element 12, since as described above, the element 12 only reflects rays falling within its virtual source to its outlet 26.

Figure 2:
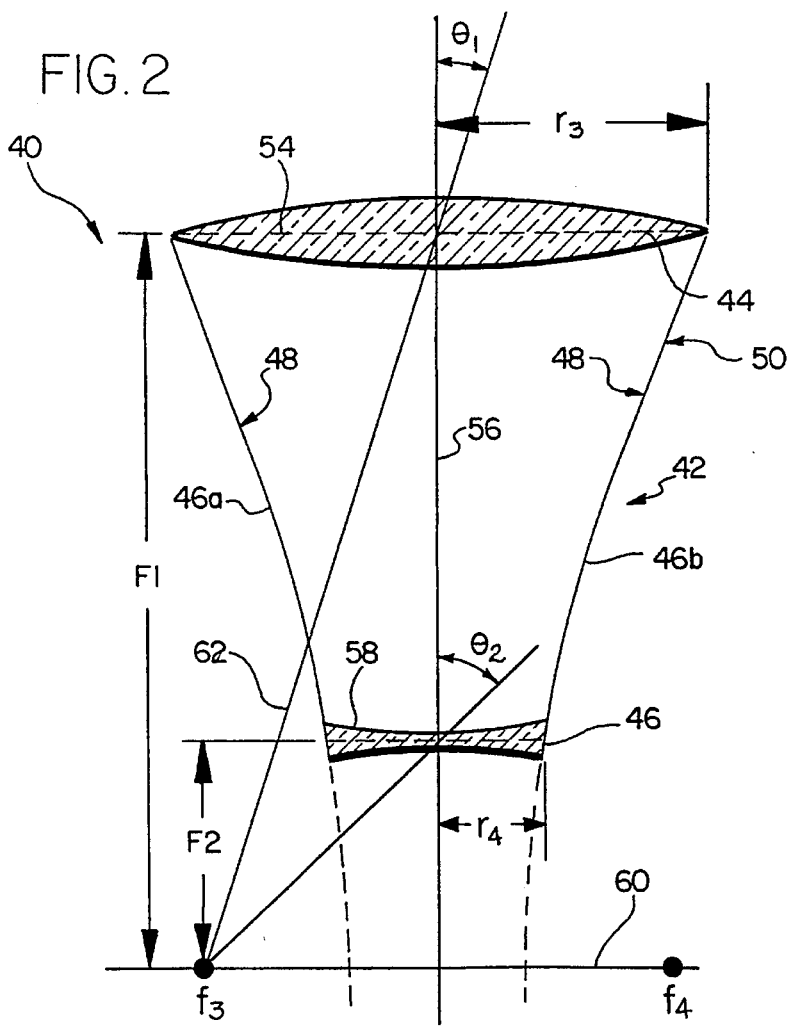
FIG. 2 illustrates one embodiment of a radiant energy transformer in accordance with the invention.

One preferred embodiment of the invention is shown in FIG. 2. This embodiment is a radiant energy transformer 40 that transmits the radiant energy incident upon its radiant energy inlet within an acute angle $\theta_1$ to its radiant energy outlet. However, instead of radiant energy being emitted from the device in all directions as in the device shown in FIG. 1, the radiant energy is emitted from the transformer 40 exclusively within a second acute angle $\theta_2$ with respect to a vertical axis.

Now referring to FIG. 2, the radiant energy transformer 40 is shown in cross-section. The transformer 40 comprises a reflective optical element 42, a convex, or converging, lens 44, and a concave, or diverging, lens 46. The reflective element 42 is hyperbolically shaped, as indicated by a pair of hyperbolic lines 46a, 46b, and may have a reflective coating applied either to the interior surface 48 or to the exterior surface 50 of the element 42. The element 42 may be rotationally symmetric about its central axis 56, or it may have two reflective sides facing or opposing each other so that it forms a trough-like structure having a rectangular inlet and a rectangular outlet for radiant energy, or it may have four reflective sides forming a pyramid-like structure, also with a rectangular inlet and a rectangular outlet for radiant energy.

The element 42, if taken as rotationally symmetric, has a first circular aperture at its top portion, indicated by dotted line 54, which acts as a radiant energy inlet. The first circular aperture, and thus the radiant energy inlet 54, have a radius equal to $r_3$, which is the horizontal distance between the central axis 56 and the circumferential edge of the radiant energy inlet. The element 42 has a second circular aperture at its bottom portion, indicated by dotted line 58, which acts as a radiant energy outlet. The radius of the second circular aperture, and thus of the radiant energy outlet, is $r_4$.

The converging lens 44 is provided at the radiant energy inlet 54 of the element 42, and the diverging lens 46 is provided at the radiant energy outlet 58. The lens 44 has a focal length $F_1$, and the lens 46 has a focal length $F_2$. The focal lengths of the two lenses 44, 46 are chosen such that the difference is focal lengths, i.e. $F_1$ minus $F_2$, substantially equals the height of the element 42, and the lenses 44, 46 also share a common focal plane, represented by an axis 60 transverse to the central axis 56.

The hyperbolic shape of the element 42, in combination with the lenses 44, 46 causes the radiant energy incident at the radiant energy inlet 54 within a predetermined acute angle $\theta_1$ to be reflected to the radiant energy outlet 58 of the transformer 40, by either one or more reflections from its surface, so that it is emitted from the radiant energy outlet 58 exclusively within a second acute angle $\theta_2$ with respect to the axis 56. Radiant energy may also pass directly through the device without impinging the interior surface 48 of the reflective element 42.

While the hyperbolic shape of the element 42 is not linear, it may be substantially linear, because a hyperbola may be substantially linear as it approaches its asymptotes. Thus the element 42 could appear to be substantially linear and yet be hyperbolic.

In order to construct the transformer 40 of FIG. 2, the radius of the radiant energy inlet 54, the focal lengths of the lenses 44, 46, and the angle of acceptance $\theta_1$ and emission angle $\theta_2$ are first be chosen. A transformer 40 may be constructed in accordance with any numeric combination of the foregoing parameters.

As indicated above in connection with the device shown in FIG. 1, it is desirable that lenses 44, 46 should be chosen to have relatively long focal lengths to minimize lens aberrations. However, with respect to the transformer 40 of FIG. 2, it should be noted that selection of lenses having long focal lengths does not have the accompanying disadvantage of requiring increased height since the height of the transformer 40 is a function of the difference in focal lengths, $F_1$ minus $F_2$, and is not directly related to either focal length.

After the foregoing parameters are chosen, the radius of the radiant energy outlet 58 is determined from Equation [2] set forth below:

$$r_4 = r_3 * \sin \theta_1 / \sin \theta_2,  \quad [1]$$

where $r_3$ is the desired radius of the radiant energy inlet, $\theta_1$ is the desired angle of acceptance, $\theta_2$ is the desired emission angle, and $r_4$ is the radius of the radiant energy outlet 58 being determined.

In order to determine the hyperbola represented by the curves 46a, 46b, the lens 44 is placed at a height $F_1$ above the transverse axis 60, and then two foci are located. The first focus $f_3$ is located by the intersection of the transverse axis 60 with a ray drawn through the center of the lens 44 at the selected angle of acceptance $\theta_1$. One such ray 62 is shown in FIG. 2. The other focus $f_4$ is located by placing it an equal distance away from the central axis 56 on the other side of the transverse axis 60. The ray 62 passes through the left focus $f_3$, and the foci $f_3$, $f_4$ are equidistant from the central axis 56.

After the two foci $f_3$, $f_4$ are determined, one of the hyperbolic curves is then determined with respect to the foci. The reflective element, which may then be manufactured in a conventional manner, extends only to the location of the second lens 46, and does not extend all the way to the transverse axis 60.

It should be noted that since the radii of the energy inlet and outlet are related as set forth in Equation [2], the radius of the radiant energy outlet 58 may be determined first, and then the radius of the inlet 54 may be determined afterwards. Which radius is determined first may depend upon the constraints of the particular application for which the device is used.

The theory of operation of the transformer 40 of FIG. 2 is as follows. The combination of the converging lens 44 and the reflective element 42 acts in a generally similar manner as the combination of the lens 14 and the reflective element 12 of FIG. 1. In FIG. 3, the edges of the virtual source coincide with $f_3$ and $f_4$, and the real source coincides with the radiant energy outlet 58. All radiant energy incident upon the lens 44 within the angle of acceptance $\theta_1$ so that it would fall within the virtual source is reflected to the radiant energy outlet 58.

The diverging lens 46 at the radiant energy outlet 58 transforms all the rays that would fall within the virtual source into a beam with an acute angular divergence $\theta_2$.

Table 1 set forth below provides actual parameters for a number of radiant energy transformers in accordance with the embodiment of FIG. 2 having an angle of acceptance $\theta_1$ equal to 1° and an exit angle $\theta_2$ equal to 14°.

TABLE 1

| Transformer Parameters | | | | |
|---|---|---|---|---|
| F Number | 5 | 10 | 16 | 50 |
| $F_1$ | 6.9 | 14.0 | 16.6 | 69.9 |
| Thickness 1 | $7.1 \times 10^{-1}$ | $3.5 \times 10^{-2}$ | $2.1 \times 10^{-2}$ | $7.0 \times 10^{-3}$ |
| $r_3$ | 0.7 | 0.7 | 0.7 | 0.7 |
| $F_2$ | 0.48 | 0.97 | 1.61 | 4.84 |
| Thickness 2 | $5.3 \times 10^{-3}$ | $2.6 \times 10^{-3}$ | $1.5 \times 10^{-3}$ | $5.1 \times 10^{-4}$ |
| $r_4$ | 0.05 | 0.05 | 0.05 | 0.05 |

Index of refraction = 1.5

A computer simulation of the transmission ratio versus F number of the four angle transformers specified by Table 1 is shown in FIG. 3. The F number of a lens is defined as the focal length divided by lens diameter. As can be seen from FIG. 3, the transmission ratio increases from approximately 0.87 towards one as the F number of the device increases from approximately five to 50. Thus, the larger F number, and hence the focal length of the lens used, the greater the transmission ratio, and thus the more "ideal" the device.

For example, the transformer having an F number of five transmits approximately 87% of the radiant energy incident at its radiant energy inlet within the angle of acceptance to its output within the selected acute angle.

Another preferred embodiment of the invention is shown in FIG. 4. This embodiment is similar to the embodiment shown in FIG. 2, but the radiant energy transformer of FIG. 4 comprises a solid dielectric material.

Now referring to FIG. 4, a radiant energy transformer 80 comprising a solid dielectric material is shown partly in cross-section and partly in elevation. The transformer 80 has a convexly curved surface 82 at its upper portion, a concavely curved surface 84 at its lower portion, and an intermediate surface 86 connected to the convex surface 82 and the concave surface 86 at a pair of circumferential edges 88, 90, respectively. The convex surface 82 acts as a radiant energy inlet and the concave surface 84 acts as a radiant energy outlet.

The intermediate surface 86 is curved to reflect radiant energy from the radiant energy inlet to the radiant energy outlet. Preferably, the intermediate surface 86 is hyperbolically curved. The intermediate surface 86 causes radiant energy to be reflected by total internal reflection, and thus no reflective coating is necessary on the device.

In accordance with Snell's law, the condition for total internal reflection is that all radiant energy be incident on the interior surface of the transformer 80 at an angle greater than the critical angle $\theta_c$, where $\theta_c$ is the arcsine of the ratio of the index of refraction of the dielectric material of transformer 80 to the index of refraction of outside material, for example air. The critical angle $\theta_c$, as shown in FIG. 4, is measured with respect to a ray perpendicular to the dielectric surface 86. Since the index of refraction of air is approximately 1, where the dielectric material comprises glass, which has an index of refraction of approximately 1.5, the critical angle is approximately 42°. Except for the manner of radiant energy reflection, the transformer 80 is constructed and operates in substantially the same manner as the transformer 40 previously described in connection with FIG. 2.

A third embodiment of the invention is shown in FIG. 5. This embodiment is directed to a radiant energy transformer 100 having two portions, each of which is similar to the concentrator 10 shown in FIG. 1 and described in connection therewith. An upper portion is shown above a transverse axis 102 and a lower portion is shown below the axis 102. The upper portion comprises a convex lens 104 placed at the radiant energy inlet of a reflective element 106. The radiant energy inlet and the lens 104 have a radius $r_5$, and the reflective element 106 has a height equal to $F_3$, which is equal to the focal length of the lens 104. The walls of the reflective element 106 are hyperbolically shaped with respect to two foci $f_5$ and $f_6$.

The lower portion of the transformer 100 comprises a convex lens 110 placed at the radiant energy outlet of a reflective element 112. The radiant energy outlet and the lens 110 have a radius $r_6$, and the reflective element 112 has a height equal to $F_4$, which is equal to the focal length of the lens 110. The height of the transformer 100 is equal to L, which equals the sum of $F_3$ and $F_4$. The walls of the reflective element 112, which meet and are flush with the walls of the element 106 at the axis 102, are also hyperbolically shaped with respect to the two loci $f_5$ and $f_6$.

The radiant energy transformer 100 acts to couple the radiant energy incident at its radiant energy inlet within a predetermined angle $\theta_3$ to the radiant energy outlet so that such radiant energy emerges exclusively within an acute angle $\theta_4$. The acute angle $\theta_3$, which is the angle of acceptance, is equal to the angle between the central axis 120 of the transformer 100 and a ray 122 extending through the focus $f_5$ and the center of the lens 104. The acute angle $\theta_4$ is equal to the angle between the central axis 120 and a ray 124 extending through the focus $f_5$ and the center of the lens 110.

One method of construction of the transformer 100 is as follows. First, the characteristics of the upper portion of the transformer 100 are determined by selecting, based upon the particular application, the desired radius $r_5$ of the energy inlet, the desired angle of acceptance $\theta_3$, and the desired focal length of the lens 104. After these three parameters are selected, the radius r7 of the reflective element 106 at the axis 102 (shown slightly above the axis 102 for purposes of clarity) is determined from Equation [3] set forth below:

$$r7 = r_5 * \sin \theta_3 \qquad [3]$$

The shape of the hyperbolic walls of the element 106 is determined by locating the two foci $f_5$ and $f_6$, and then by making the walls hyperbolic with respect thereto. The focus $f_5$ is located by finding the intersection point of the transverse axis 102 with a ray drawn through the center of the lens 104 at the desired angle of acceptance $\theta_3$. The other focus $f_6$ is located by placing it on the axis 102 at a distance from the central axis 120 equal to the distance between the focus $f_5$ and the axis 120. After the foci $f_5$ and $f_6$ are located, the hyperbolic walls are determined with respect to the foci.

After the characteristics of the upper portion are determined, the characteristics of the lower portion are determined, subject to the requirement that the radius of the reflective element 112 at the axis 102 be the same as the radius of the reflective element 106 at the axis 102. Initially, the desired exit angle $\theta_4$ and the desired focal length of the lens 110 are selected. The radius $r_6$ of the lens 110 is then determined based upon the selected angle $\theta_4$ and the radius r7 of the element 106 at the axis 102 in accordance with Equation [4] set forth below:

$$r_6 = r7/\sin \theta_4 \qquad [4]$$

The shape of the hyperbolic walls of the element 112 is determined by locating two foci and then by making the walls hyperbolic with respect to the loci. The first focus is located by determining the intersection point of the transverse axis 102 with a ray drawn through the center of the lens 110 at the exit angle $\theta_4$. The other focus is located by placing it on the axis 102 at a distance from the central axis 120 equal to the distance between the focus just determined and the axis 120. After the two loci are located, the hyperbolic walls of the element 112 are determined with respect to the loci.

Another important feature of the invention is based upon a recently discovered characteristic of nonimaging devices. It has been previously known that it is advantageous that ideal nonimaging devices have a reflective wall portion with a shape corresponding to flow lines of radiant energy emitted from a radiant energy source. The concept of radiant energy flow lines is well known and is described in 1) U.S. Pat. No. 4,237,332 issued to Roland Winston and entitled "Nonimaging Radiant Energy Direction Device"; 2) Winston, et al., "Geometrical Vector Flux and Some New Nonimaging Concentrators," *Journal of the Optical Society of America*, Vol. 69, No. 4, pp. 532–536 (April 1979); 3) Winston, et al., "Ideal Flux Concentrators As Shapes That Do Not Disturb the Geometrical Vector Flux Field: A New Derivation of the Compound Parabolic Concentrator," *Journal of the Optical Society of America*, Vol. 69, No. 4, pp. 536–539 (April 1979); 4) Gallagher, et al., "Test of a 'Trumpet' Secondary Concentrator With a Paraboloidal Dish Primary," *Solar Energy*, Vol. 36, No. 1, pp. 37–44 (1986); and 5) Gallagher, et al., "Axially Symmetric Nonimaging Flux Concentrators With the Maximum Theoretical Concentration Ratio," *Journal of the Optical Society of America A*, Vol. 4, p. 66 (January 1987). These five publications are incorporated herein by reference.

It has also been known that radiant energy flow lines through air are hyperbolic in shape. Accordingly, the preferred embodiments of the invention as shown in FIGS. 1, 2, 4, and 5 have optical elements with reflective surfaces which are hyperbolic.

It has been discovered that radiant energy flow lines change their shape when they pass through solid dielectric elements. Since it is often useful to incorporate dielectric optical elements in nonimaging systems, it would be advantageous to be able to determine the paths of radiant energy flow lines through a dielectric material.

A method of determining radiant energy flow lines within a dielectric material is explained below in connection with FIG. 6. Now referring to FIG. 6, a source of radiant energy 140 is shown to have two edges, a first edge $E_1$ and a second edge $E_2$. The source of radiant energy 140, which is shown as a linear source, may be circular source or a source of any other shape. A solid dielectric optical element 142, which may be a lens for example, is shown to the right of the radiant energy source 140. The optical element 142 has a pair of convexly curved surfaces 144a and 144b.

A pair of radiant energy flow lines 146, 148 extend from the radiant energy source 140 through air to the left surface 144a of the optical element 142, through the dielectric material of optical element to the right surface 144b, and again through air to the right of the surface 144b. Since radiant flow lines are hyperbolic in shape when they pass through air, the portion of the lines 146, 148 between the radiant energy source 140 and the surface 144a are hyperbolic with respect to the edges $E_1$ and $E_2$. However, when the radiant flow lines enter the dielectric material 142, they change shape.

The particular manner in which the flow lines change shape has been discovered. In order to explain the manner in which they change shape, however, a new concept is required. For purposes of the present invention, the term "actual optical distance" means the distance that an optical ray travels within an optical system. For purposes of the present invention, the term "effective optical distance" means the summation along an optical path of the product of 1) the actual optical distance times 2) the dielectric constant of the dielectric medium for that distance. More specifically, the effective optical distance for a ray with edges A and B is in accordance with Equation [5] below:

$$\text{Effective length} = \int_A^B n \, dS, \qquad [5]$$

where effective length is the effective optical length, n is the particular dielectric constant at a particular point, and S represents the actual optical distance.

Figure 6:
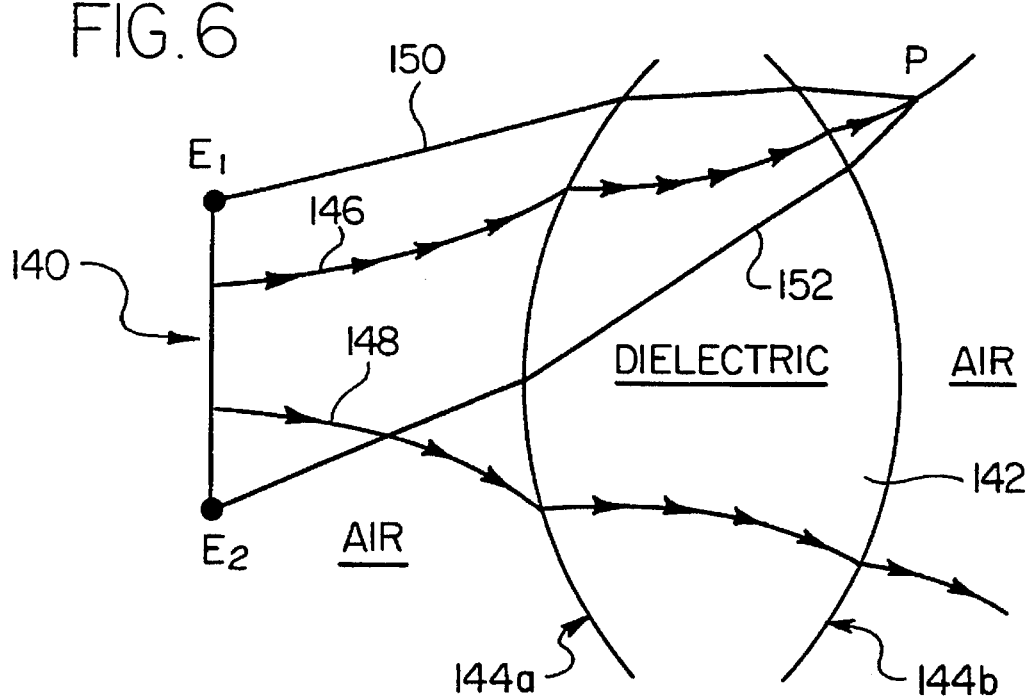
FIG. 6 illustrates a pair of radiant energy flow lines from a source of radiant energy through a solid dielectric optical element.

As an example, the effective optical distance of the ray 150 shown in FIG. 6 from the radiant source 140 to the point P is its actual length from the radiant source 140 to the surface 144a times the dielectric coefficient for air, plus its actual length from the surface 144a to the surface 144b times the dielectric coefficient for the dielectric medium 142, plus its actual distance from the surface 144b to the point P times the dielectric coefficient of air.

The method of determining the radiant energy flow lines through a dielectric is now explained with reference to FIG. 6. The portion of the flow line 146 from the radiant source 140 to the edge 144a, which is in air, is hyperbolic. Thus, in accordance with the definition of a hyperbola, for each point on the line 146, the difference between the actual distance from that point and one edge $E_1$ and the actual distance between that point and the other edge $E_2$ is constant. When the ray 146 enters the dielectric material 142, the ray 146 is no longer actually hyperbolic; that is, it is no longer hyperbolic with respect to the actual distances between the foci $E_1$ and $E_2$. However, it has been discovered that the flow line 146 is "effectively hyperbolic," meaning that the line 146 is hyperbolic within the dielectric material 142 if the effective distances, as defined above, between the flow line 146 and the two foci $E_1$ and $E_2$ are used instead of the actual distances. Also, instead of using straight-line distances between each point on the flow line 146 and the two foci or edges $E_1$ and $E_2$, the optical paths between the edges $E_1$ and $E_2$ and the flow line 146 are used.

Thus, for each point on the two flow lines 146, 148, the difference between 1) the effective optical distance from the edge $E_1$ to that point and 2) the effective optical distance from the edge $E_2$ to that point is substantially constant. For example, for the point P on line 146, the effective distance, as defined above, along the optical path 150 from the edge $E_1$ to the point P is shorter by the same amount than the effective distance along the optical path 152 from the edge $E_2$ to the point P.

The correctness of the method of determining radiant energy flow lines in a dielectric material in accordance with the above description can be proven.

Figure 7:
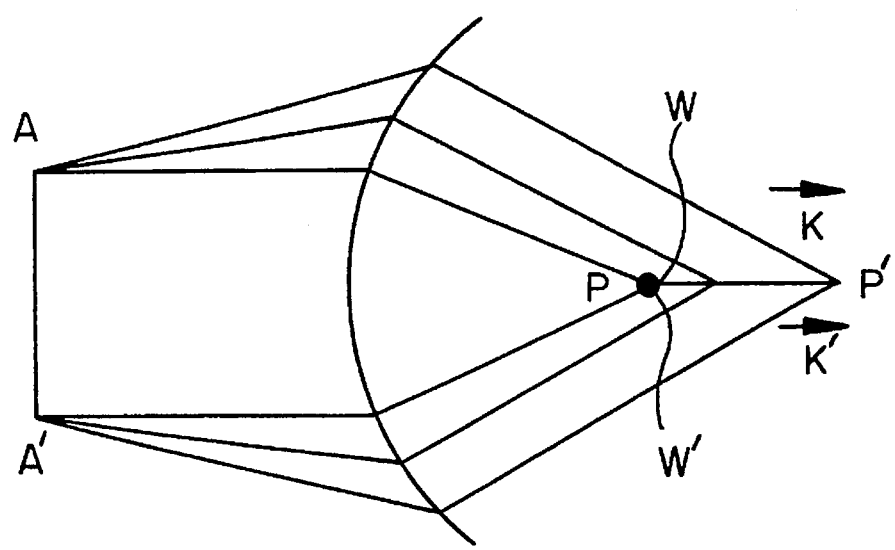
FIG. 7 is a diagram referred to in connection with a proof of a principle of the present invention.

We will now prove that the flow lines in a refractive medium can be obtained from a string construction in a similar manner to that in free space provided we use the optical path length as the measure of the length of the string. With reference to FIG. 7, let A,A' be the edges of the radiant energy source and suppose we wish to know the direction of the line of flow at point P. Let P' be a nearby point along the flow line passing through P. Notice that both P and P' are inside a refractive element. By the string construction, [A'P]−[AP] is constant and equal to [A'P']−[AP'] where the bracket [AP] denotes the optical path length from point A to point P and a similar notation is used for the other brackets. Let W be a curve of constant optical path for the fan of rays from A and W' be a curve of constant optical path for the fan of rays from A' (i.e., W and W' are wave fronts). Consider the following line integral on the closed path P→P'→W'→P; $\int n\vec{k}.d\vec{l}=0$ which follows from the Hilbert Integral Theorem. Here $\vec{k}$ is the unit ray direction and $d\vec{l}$ is a line segment. This shows that $[WP']=\int n\vec{k}.d\vec{l}$ (where "." signifies the dot product). Similarly, by considering the line integral $\int n\vec{k}.d\vec{l}=0$ on the closed path P→P'→W→P, we obtain $[P'P]=\int n\vec{k'}.d\vec{l}$. Notice that [AP']=[AP]+[WP'] and also [A'P']=[A'P]+[W'P']. Therefore, if we keep [A'P]−[AP] =[A'P']−[AP'] by the string construction we ensure that [WP']=[W'P']. Therefore, since the points P and P' are close together, the line segment between P and P' makes the same angle with $\vec{k}$ as with $\vec{k}'$. This means that the line segment bisects the angle between $\vec{k}$ and $\vec{k}'$. Therefore we can conclude that this line segment lies along a flow line because the primitive definition of the lines of flow of geometrical vector flux is that it is the average direction of the flux and the bisector is just the average direction.

Figure 8:
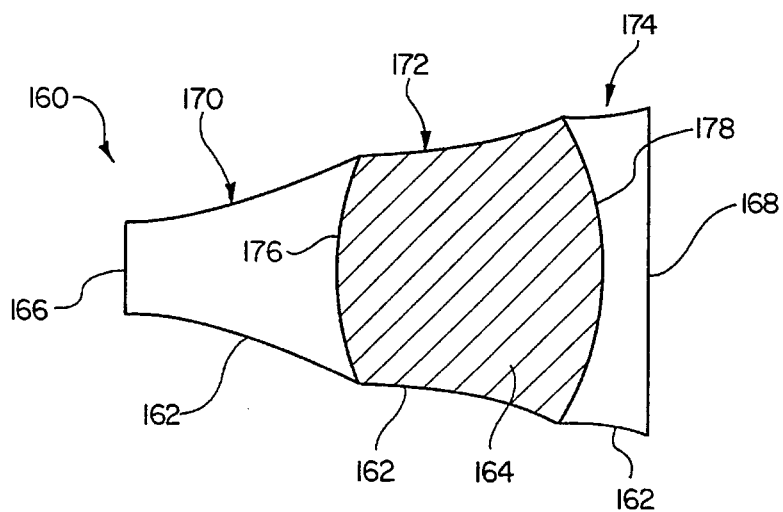
FIG. 8 is a cross-sectional view of a first embodiment of the invention in accordance with the principles of FIG. 6.

A first embodiment of the invention taking advantage of the principles just described is shown in FIG. 8, which is a cross-sectional view of a radiant energy device 160. The device 160 comprises two basic parts including a reflective element 162 and a dielectric optical element 164 within the reflective element 162. The reflective element 162 has a radiant energy inlet 166 and a radiant energy outlet 168, and the element 162 comprises three portions, a first portion 170, a second portion 172, and a third portion 174. The exterior shape of the reflective element 162 substantially corresponds to the shape of the radiant energy flow lines 146, 148 shown in FIG. 6. In particular, the shape of the portion 170 is actually hyperbolic, the shape of the portion 172 is "effectively hyperbolic," and the shape of the portion 174 is actually hyperbolic.

The dielectric element 164 has two curved surfaces 176, 178 that correspond in shape to the curved surfaces 144a, 144b, respectively, in FIG. 6.

The manner of construction of the radiant energy device of FIG. 8 is relatively straightforward. Initially, the hyperbolic shape of the first portion 170 is determined in accordance with the method described above in connection with FIG. 2. The shape of the second portion 172 is determined, taking into account the curvature of the surfaces 176, 178, as explained in connection with FIG. 6. The shape of the third portion is determined by making it actually hyperbolic. After the shape of the three portions 170, 172, 174 is determined, the optical element can then be conventionally formed, by a lathe for example.

Depending upon the particular application, variations of the device 160 may be made; for example, it may be desirable to omit the portion 174 of the optical element 162.

Figure 9:
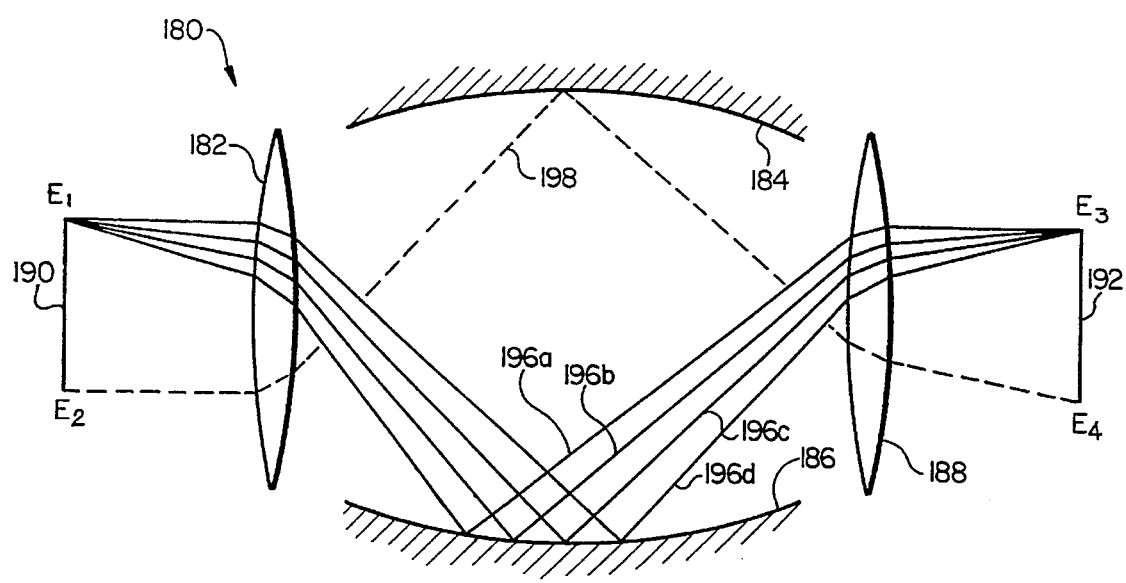
FIG. 9 is a cross-sectional view of a second embodiment of the invention.

A second embodiment of the invention utilizing the path of radiant flow lines within a dielectric is shown in FIG. 9, which is a cross-sectional view of a radiant energy device comprising a first lens 182 optically coupled to a pair of reflective, nonlinear surfaces 184, 186, each of which is optically coupled to a second lens 188. For purposes of the present invention, a surface is considered to be "linear" if it is linear in cross-section. Thus for example, a cone is an example of a linear surface, whereas a hyperbolically shaped surface is an example of a nonlinear surface. The lenses 182, 188 are converging lenses. The lens 182 is optically coupled to a radiant energy source or inlet 190, and the lens 188 is optically coupled to a radiant energy receptor or outlet 192. Since the device 180 is optically reversible, the source 190 could constitute the receptor 192, and vice versa.

The surfaces 184, 186 are specially shaped so that the effective optical distance between a point on the radiant energy source 190 and a respective point on the radiant energy receptor 192 is substantially constant. In particular, the effective optical distance from the edge $E_1$ of the radiant source 190, to the lens 182, the surface 186, the lens 188, and the edge $E_3$ of the receptor 192 is the substantially the same for any optical path, such as the paths 196a, 196b, 196c, 196d. While the edges $E_1$ and $E_3$ are shown as points, the edges may be distributed curves as shown in U.S. Pat. No. 4,483,007. Conceptually, if a string with a constant effective length were attached between the edge $E_1$ and the edge $E_3$ and constrained to move along optical paths, the movement of the string would trace a path coinciding with the surface 186. This tracing concept is similar to the well-known manner in which an ellipse is formed by fixing two ends of a string at the loci of the ellipse and tracing the ellipse with a pencil.

The surface 184 is similarly curved so that the effective optical distance from the edge $E_2$ of the radiant source 190, to the lens 182, the surface 184, the lens 188, and the edge $E_4$ of the receptor 192 is the substantially the same for any optical path, such as the one shown by the dotted line 198.

Various modifications of the embodiments of the invention described above may be made while still utilizing the present invention. In particular, since the radiant energy devices may be operated symmetrically, the terms "radiant energy inlet" and "radiant energy outlet" may be used interchangeably with respect to such devices. Radiant energy devices in accordance with the invention may have many applications not specifically mentioned in the foregoing specification.

The radiant energy devices shown and described above may be rotationally symmetric, may comprise trough-like structures, or may comprise four-sided pyramid-like structures. For example, in FIG. 2, if the curves 46a, 46b represented opposing walls of a trough, the walls 46a, 46b would thus extend linearly in a direction directly into the paper. Cylindrical lenses would be used, the cylindrical lenses extending the length of the trough.

In addition, the various embodiments may be made pyramid-like, so that the radiant energy device would have four sides of approximately the same length. The four sides would then meet at substantially right angles. The radiant energy inlet and outlet in this case would be rectangular, as would the lenses used. This pyramid-like embodiment would be useful in optical display systems since the efficiency of such a pyramid-like device is greater when the device is used as a light radiator than when it is used as a light collector.

Further modifications and alternative embodiments of the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A radiant energy device comprising:

a radiant energy source with an edge;

a first lens positioned to receive radiant energy from said radiant energy source;

an optical element optically coupled to said first lens, said optical element having a nonlinear reflective surface positioned to receive radiant energy from said first lens;

a second lens optically coupled to said optical element whereby radiant energy passing through said first lens impinges upon said nonlinear reflective surface of said optical element and is reflected to said second lens; and a radiant energy receptor positioned to receive radiant energy from said second lens, said radiant energy receptor having an edge, said nonlinear reflective surface of said optical element being shaped such that the effective optical distance of a plurality of optical paths between said edge of said radiant energy source and said edge of said radiant energy receptor is substantially constant.

2. A radiant energy device as defined in claim 1 wherein the entire portion of said nonlinear reflective surface is shaped such that, for each point on said nonlinear reflective surface, the effective optical path distance between said edge of said radiant energy source and said edge of said radiant energy receptor is substantially constant.

3. A radiant energy device as defined in claim 1 wherein said radiant energy source comprises a radiant energy inlet.

4. A radiant energy device as defined in claim 1 wherein said radiant energy receptor comprises a radiant energy outlet.

5. A radiant energy device as defined in claim 1 wherein said first lens comprises a converging lens and wherein said second lens comprises a converging lens.

* * * * *